July 5, 1966

O. DAHLE 3,258,962

MAGNETO-ELASTIC FORCE MEASURING DEVICE

Filed Feb. 4, 1964

3 Sheets-Sheet 1

A-A

INVENTOR.
ORVAR DAHLE

BY Bailey, Stephens
& Huettig

July 5, 1966  O. DAHLE  3,258,962
MAGNETO-ELASTIC FORCE MEASURING DEVICE
Filed Feb. 4, 1964  3 Sheets-Sheet 2

INVENTOR.
ORVAR DAHLE
BY Bailey, Stephens & Huettig

July 5, 1966     O. DAHLE     3,258,962
MAGNETO-ELASTIC FORCE MEASURING DEVICE

Filed Feb. 4, 1964     3 Sheets-Sheet 3

INVENTOR.
ORVAR DAHLE
BY
Bailey, Stephens &
Huettig 3,258,962
MAGNETO-ELASTIC FORCE MEASURING DEVICE
Orvar Dahle, Vasteras, Sweden, assignor to Allmanna
 Svenska Elektriska Aktiebolaget, Vasteras, Sweden, a
 corporation of Sweden
Filed Feb. 4, 1964, Ser. No. 342,477
Claims priority, application Sweden, Feb. 14, 1963,
1,602/63
12 Claims. (Cl. 73—141)

In order to be able to measure bearing loads and loads from a fixed shaft pivot on surrounding construction parts it is usual to arrange a measuring device of some kind in the bearing housing, which is subjected to the influence of the force which is to be measured. In exceptional cases it may be difficult or quite impossible within accessible areas to arrange a conventional measuring device in the bearing housing. It may for example happen that a bearing bracket supports several shafts with different loads and it is desirable to measure all bearing loadings independently of each other.

The present invention relates to a magneto-elastic measuring device, which with the least possible space may be positioned for measuring of the above-mentioned type of loads. The measuring device is annular and arranged concentrically with the object, the load of which is to be measured. The measuring device consists of a cylindrical, annular core of magnetostrictive material, in which a number of holes are made which are parallel with the longitudinal axis of the core and are provided with windings for generating magnetic flow around the holes and for sensing the magnetic flow changes which arise in the core when it is subjected to mechanical force.

Figure 1:
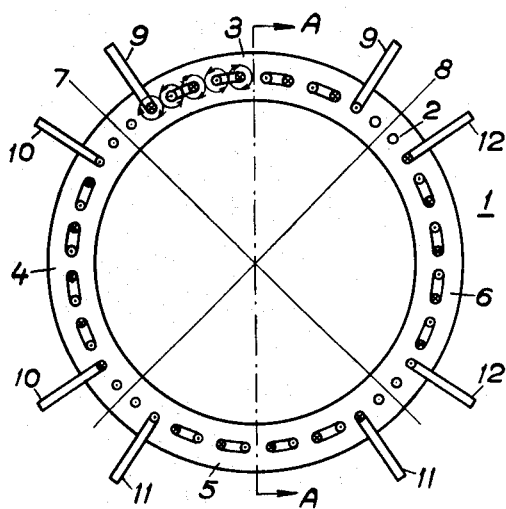
Figure 2:
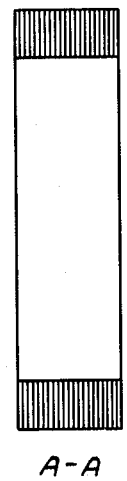
Figure 3:
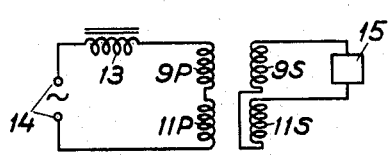
Figure 4:
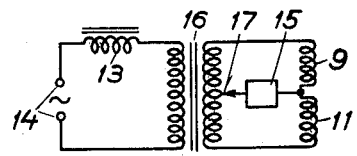
Figure 5:
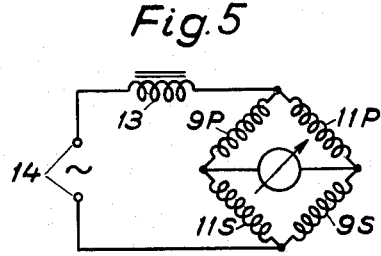

On the accompanying drawing FIGURE 1 shows an end view of an embodiment of the measuring device according to the invention. FIGURE 2 shows a section along the line II—II in FIGURE 1, while FIGURES 3, 4 and 5 show examples of how the windings may be connected for power measuring with the measuring device.

In the embodiment of the measuring device shown on the drawing its core consists of a cylindrical ring 1. If the measuring means is intended for measuring the load on a ball or roller bearing, the inner diameter of the ring is made equal to the outer diameter of the outer bearing ring of the bearing. The measuring means will then function as a lining for the bearing fixed in the bearing bracket. The ring 1 is built up of a number of rings, which are cut out of a magnetostrictive material, for example transformer sheet. In the rings a number of identical holes 2 are cut out with even distribution, the number of which is divisible by four. The holes are laid in a dividing circle which is located at equal distances from both edges of the ring. When the sheet rings are stacked on each other axial channels are thus formed in the measuring device.

The measuring device is pictured as divided into four quadrants 3, 4, 5 and 6 by the lines 7 and 8 in FIGURE 1. Each of the quadrants is provided with a winding 9, 10, 11 and 12 arranged in the holes. The winding 9 arranged in the upper quadrant 3 goes down in the second hole from the left and comes up in the third, goes down in the fourth, and so on. Between the windings in the different quadrants one or more holes are left free which may be used for attachment of extra reinforcing rivets, control pins for the final erection or the like. In FIGURE 1 single-turn windings are shown, but as these should have very low inductance, multi-thread cable with mutually insulated threads may advantageously be used, which threads are connected together after winding so that a multi-turn winding is obtained. In this way it is also possible to divide the winding into two parts, which may be used as primary and secondary windings.

When the windings are fed with current magnetic fields are generated in the iron around the windings. As will be seen from FIGURE 1 the magnetic fluxes from two adjacent winding parts will go in the same direction in the part of the iron core which lies between the holes carrying respective winding parts. The distance between the holes must be chosen so small that a marked choking of the magnetic flux between the holes is obtained.

If the force which activates the measuring device is applied in such a way that the upper quadrant 9 is compressed, the parts of the core situated between the holes will be subjected to compressive stress. Such a force is applied if the measuring means supports the bearing for the upper roller of a roller pair in a rolling mill and rolling goods are inserted between the rollers. The lower quadrant of the measuring means is substantially unaffected by the force. With such a force the reluctance increases in the parts between the holes in the upper quadrant 3, which means that the inductance of the winding 9 decreases, while the inductance of the winding 11 in the lower quadrant 5 is substantially unchanged. This inductance change may be sensed in many ways, of which two are shown in FIGURES 3 and 4. In the method according to FIGURE 3 use is made of the earlier mentioned possibility of dividing up the winding made up of the multi-thread cable into a primary magnetising winding and a secondary measuring winding. The primary windings 9P and 11P are fed with current over a series reactor 13 from an alternating current source 14 and the secondary windings 9S and 11S are connected in counter-direction to each other so that the voltage indicated by a measuring instrument 15 is a measure of the inductance difference and thereby also of the force working on the measuring device. In the method shown in FIGURE 4 the windings 9 and 11 are not divided. The inductances in the two windings are compared with the help of a differential connection 16. The zero balance is adjustable by a variable centre terminal 17 in one of the windings of the differential connection.

A third possibility is shown in FIGURE 5. With this connection divided windings are used, that is primary and secondary windings in two diametrically situated quadrants. The four windings are connected in bridge connection in such a way that the two windings in the one quadrant 9P, 9S lie opposite each other and two windings in the other quadrant also lie opposite each other.

Measuring of horizontal forces working on the measuring device is carried out in the same way by comparing the inductance changes of the windings 10 and 12. Of course forces with any direction may be measured. An inclined force may therefore be divided into a vertical force component, which is measured by the upper and lower quadrants, and a horizontal force component which is measured by the left and the right quadrants.

Figure 6:
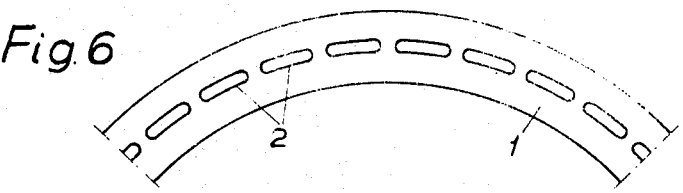

In order to increase the sensitivity of the measuring device the construction of the cylindrical ring 1 shown in FIGURE 1 may be modified as is evident from FIGURE 6. In this modification, the holes 2 for the windings are made along, which causes the power-absorbing parts between the holes to be less in number. The load on each of said parts increases with the same total load to the same extent as the number of holes decreases, thereby increasing the sensitivity of the measuring device.

The embodiment of the invention generally functions very satisfactorily, but in certain cases it may occur that the measuring value is not wholly independent of the fit between the measuring means and connecting cylinder surfaces. This is partly because the whole vertical force is not absorbed by the actual quadrant of the measuring means, but a certain part is absorbed by the side quadrants essentially as shearing strain, and partly because the sensitivity of the actual measuring quadrant is greatest in the centre where pure compression strain is maintained in the measuring zones while the outer parts of the measuring quadrant have lower sensitivity, since shear is also maintained in the measuring zones.

Figure 7:
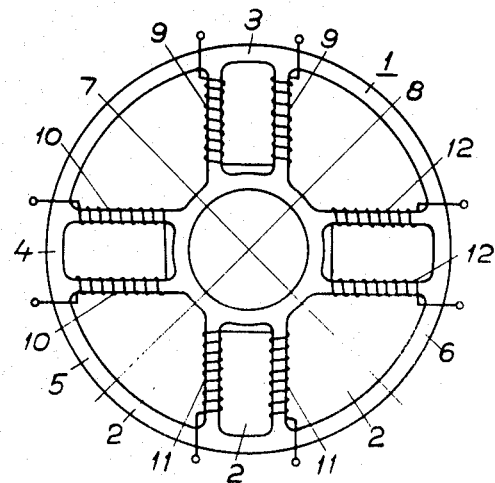

In the event that the space is not too limited in radial direction the above-mentioned drawback may easily be eliminated with an embodiment of the invention shown in FIGURE 7. In this modification the holes in each quadrant are so constructed that the parts of the core situated between them constitute two longitudinally tensioned braces, which are each provided with at least one winding for generating the magnetic flux in the braces and for sensing the flux changes which arise in the braces when the measuring device is subjected to mechanical force. For each quadrant the parts of the winding arranged on both the braces are so connected that they cooperate to drive a magnetic flux through the braces and the parts of the outer and the inner ring part holding the braces together. In this way a closed magnetic flux is obtained for each quadrant which is wholly unaffected by the fluxes in the other quadrants. The braces in a quadrant are perferably parallel and so weak transverse to the longitudinal direction that they are practically unable to absorb any side forces. With suitable dimensioning of the eight braces vertical forces are thus absorbed almost completely by the upper or lower braces, while horizontal forces in a corresponding way are absorbed by the left or right braces. The measuring zone, which is composed of the braces, is hereby completely independent of the fit between the measuring device and connecting cylinder surfaces. If the measuring device is arranged to support a shaft going through the central hole and is activated by this shaft by a force which is not parallel with any of the braces, two measuring zones will be activated. If for example said force slants downwards to the left both the lower and the left measuring zones will be activated and thereby each will measure its component of the force.

Figure 8:
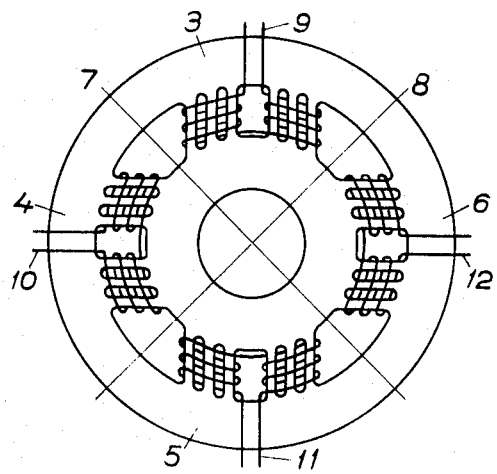

An increase of the carrying capacity may be obtained with this principle by increasing the number of parallel braces in each of the four directions. FIGURE 8 shows how this can be made with the braces in each quadrant collected in two groups with a winding around each group. With this embodiment the total magnetic flux from one group of braces will pass through the outer and the inner ring, and therefore the area of both the rings must be calculated so that saturation does not occur.

Figure 9:
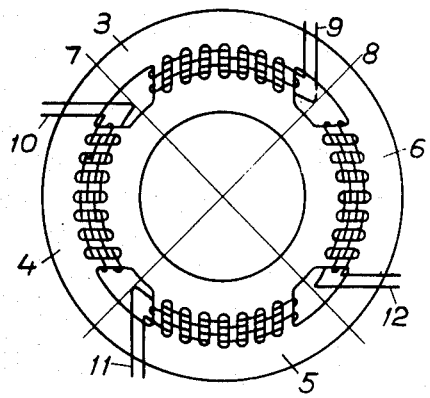

FIGURE 9 shows how the braces in a quadrant may be arranged evenly distributed and where the winding is so placed on the braces that a consecutively reversed magnetising direction in the braces is obtained. In this case the risk of saturation in the outer and inner rings is decreased and these may therefore be kept narrow.

Figure 10:
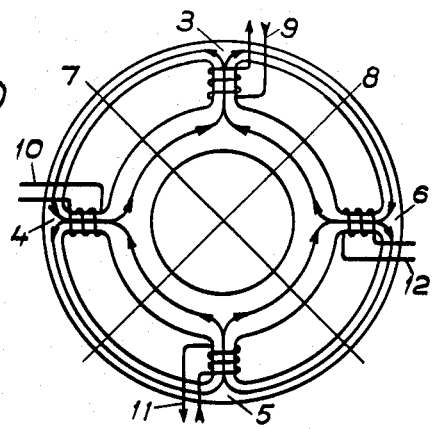

If instead the sensitivity needs to be increased, which is often the case in strip tension meters or strip balances, the number of braces should be decreased. The greatest sensitivity is obtained if there is only one brace per quadrant as shown in FIGURE 10. As is evident from the figure, the fluxes are connected to each other in the vertical and horizontal braces and therefore measuring can only take place in one direction by loading the two magnetised braces, in this case the vertical ones. Both these braces are magnetised in the same direction, whereas as is seen the flux in the horizontal braces is zero for unloaded measuring devices. Upon pressure loading of the lower brace the flux is decreased through this whereas the flux through the upper brace is either unchanged if the outer ring has negligible rigidity or on the other hand increases somewhat. In both cases a difference flux is maintained through the horizontal braces and this difference flux, which is a measure of the load, may be measured with the help of secondary coils on the horizontal braces. For this both the vertical coils are suitably measured in series. Instead of measuring the difference flux direct it is of course possible to make use of any of the difference connections according to FIGURE 3, 4 or 5.

Figure 11:
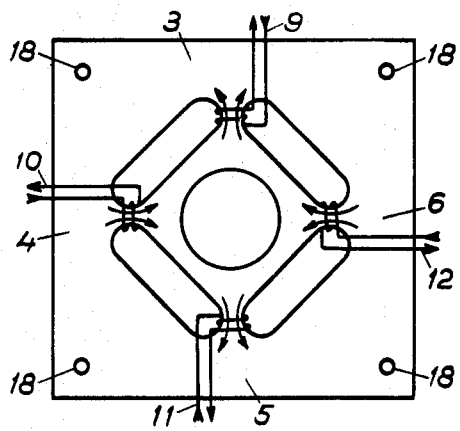

For manufacturing the plate rings for the measuring device according to the above description special punching tools are of course required. A modification which can be freely composed for different dimensions with existing punches is shown in FIGURE 11. The outer contour has here been drawn square and provided with four securing holes 18, but it can naturally just as well be made round as shown previously.

For measurement in only one direction, which is usually the case, the measuring devices according to FIGURES 8 and 9 may naturally be wound as is shown in FIGURE 10, i.e. with four windings, each enclosing a brace group, in which the windings around the loaded brace groups can be fed in series as primary windings and the difference flux in the unloaded brace groups may be sensed with the secondary windings surrounding these. In such a case the inner and outer rings must of course be dimensioned so that the induction in them is always much lower than in the measuring braces.

I claim:

1. Magneto-elastic annular device for measuring mechanical forces acting perpendicular to the centre axis of cylindrical means such as bearings, axle bars, and the like, said device having an annular core of magnetostrictive material, said core having a number of holes therein parallel to the centre axis of said core, said holes being provided with windings for generating magnetic fluxes around said holes and for measuring the change of the reluctance of said core when said core is loaded by mechanical forces.

2. A device according to claim 1, said core consisting of a number of stacked rings of magnetostrictive material.

3. A device according to claim 2, said holes being at equal distance from each other and their number being a multiple of four, said holes lying on a circle dividing the width of said rings into two equal parts.

4. A device according to claim 1, the transverse cross-section of said core consisting of four quadrants, said windings including a winding in each of said quadrants for generating magnetic flux in said core and for measuring the change of the inductance caused by action of a mechanical force upon said core, said windings being arranged in said holes.

5. A device according to claim 4, each of said windings comprising two parts, a primary part and a secondary part, said device further comprising an alternating current generator, a reactance element and a measuring device, two diametrically situated primary winding parts being connected through said reactance element to said alternating current generator, the corresponding secondary winding parts being connected in opposition to each other to said measuring device.

6. A device according to claim 4, each quadrant having a single winding, said device further including a differential transformer, two diametrically disposed windings being connected in series to the secondary winding of said differential transformer, such secondary winding having a center tap and a measuring device connected to said center tap and to the point of connection of said two diametrically disposed windings.

7. A device according to claim 4, the winding of each quadrant being divided into two equal parts, a primary winding part and a secondary winding part, said two winding parts of two diametrically situated quadrants being connected in a bridge connection, said bridge connection having the two winding parts of one of said quadrants situated opposite each other.

8. A device according to claim 1, the cross-section of said holes being oblong.

9. A device according to claim 1, the transverse cross-section of said core consisting of four quadrants, the number and shape of said holes being such that the parts of the core situated between the holes constitute at least one brace in each quadrant of the core.

10. A device according to claim 9, said core having two braces between said holes in each quadrant of the core, said windings including a winding on each of said braces.

11. A device according to claim 9, said core having several braces in each quadrant arranged in two groups, said windings including a winding on each of said groups.

12. A device according to claim 9, said core having several braces in each quadrant, said braces being uniformly distributed and said windings including a winding on each of said braces producing a magnetic flux with consecutively changed direction in said braces.

No references cited.

RICHARD C. QUEISSER, *Primary Examiner.*